US010587404B2

(12) United States Patent
Birke et al.

(10) Patent No.: US 10,587,404 B2
(45) Date of Patent: Mar. 10, 2020

(54) POSTPONING ENTROPY DEPLETION IN KEY MANAGEMENT SYSTEMS WITH HARDWARE SECURITY MODULES

(71) Applicant: International Business Machines Corporation, Armonk, NY (US)

(72) Inventors: Robert Birke, Kilchberg (CH); Mathias Björkqvist, Rueschlikon (CH); Yiyu Chen, Thalwil (CH); Mitch Gusat, Langnau a.A. (CH); Navaneeth Rameshan, Zurich (CH); Martin Schmatz, Rueschlikon (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 295 days.

(21) Appl. No.: 15/800,173

(22) Filed: Nov. 1, 2017

(65) Prior Publication Data

US 2019/0132127 A1    May 2, 2019

(51) Int. Cl.
| | | |
|---|---|---|
| *H04L 9/08* | (2006.01) | |
| *G06F 7/58* | (2006.01) | |
| *H04L 29/06* | (2006.01) | |

(52) U.S. Cl.
CPC ............ *H04L 9/0869* (2013.01); *G06F 7/58* (2013.01); *H04L 9/0822* (2013.01); *H04L 9/0877* (2013.01); *H04L 63/0428* (2013.01); *H04L 63/123* (2013.01); *H04L 63/0442* (2013.01); *H04L 2209/26* (2013.01)

(58) Field of Classification Search
CPC . G06F 7/58; H04L 9/08; H04L 9/0861; H04L 9/0869
See application file for complete search history.

(56) References Cited

U.S. PATENT DOCUMENTS

| | | | |
|---|---|---|---|
| 5,016,275 A | 5/1991 | Smith | |
| 8,369,529 B1 | 2/2013 | Agarwal et al. | |
| 9,548,862 B1 * | 1/2017 | Potter | ................... H04L 9/0662 |
| 9,674,892 B1 | 6/2017 | Li et al. | |
| 9,767,295 B2 * | 9/2017 | Boenisch | .............. H04L 9/0819 |
| 9,973,496 B2 * | 5/2018 | Boenisch | ............ H04L 63/0853 |
| 10,211,977 B1 * | 2/2019 | Roth | ........................ H04L 9/08 |
| 2012/0054582 A1 * | 3/2012 | Byom | ................. G06F 11/1072 |
| | | | 714/773 |

(Continued)

*Primary Examiner* — Khang Do
(74) *Attorney, Agent, or Firm* — Cantor Colburn LLP; Daniel Morris

(57) ABSTRACT

Embodiments of the invention provide a computer-implemented method for managing cryptographic objects in a key management system. This system comprises a set of one or more hardware security modules (HSMs), as well as clients interacting with the HSMs on behalf of users who interact with the clients. The method comprises monitoring, for each HSM of the set, an entropy pool and/or a load at each HSM. The entropy pool of a HSM is the entropy that is available at this HSM for generating cryptographic objects. The load induced at a HSM is the load due to the users interacting with the clients to obtain cryptographic objects. Cryptographic objects are generated, at each HSM, according to the monitored entropy pool and/or load. The extent to which such objects are generated depends on the monitored entropy pool and/or load.

24 Claims, 4 Drawing Sheets

(56) References Cited

U.S. PATENT DOCUMENTS

| | | | |
|---|---|---|---|
| 2015/0117646 A1* | 4/2015 | Best | H04W 12/08 |
| | | | 380/270 |
| 2015/0143136 A1* | 5/2015 | Barney | G06F 21/78 |
| | | | 713/193 |
| 2015/0160924 A1* | 6/2015 | Kiefer | G06F 21/602 |
| | | | 708/250 |
| 2015/0160925 A1* | 6/2015 | Kiefer | G06F 7/58 |
| | | | 708/250 |
| 2016/0099813 A1* | 4/2016 | Suryavanshi | H04L 9/14 |
| | | | 713/175 |
| 2016/0342394 A1 | 11/2016 | Tsirkin | |
| 2017/0034167 A1 | 2/2017 | Figueira et al. | |
| 2017/0085654 A1 | 3/2017 | Mikhailov et al. | |
| 2017/0093585 A1* | 3/2017 | Lee | G06Q 40/02 |

* cited by examiner

POSTPONING ENTROPY DEPLETION IN KEY MANAGEMENT SYSTEMS WITH HARDWARE SECURITY MODULES

BACKGROUND

The invention relates in general to the field of computer-implemented methods for managing cryptographic objects in a system comprising hardware security modules (HSMs) interacting with computerized clients, as well as related computerized systems. In particular, it is directed to methods aiming at mitigating (i.e., postponing or even preventing) entropy depletion in a key management system of HSMs.

Key management relates to the management of cryptographic keys in a cryptosystem, which involves operations such as the generation, storage, use, destruction and replacement of keys. Key management requires specific cryptographic protocols, key servers, and other procedures.

Generally, a key management system (KMS) is a system that generates, distributes and, more generally, manages cryptographic keys for clients (devices, applications). A KMS may handle several aspects of security, these ranging from secure generation of keys up to secure key handling and storage on the clients. A KMS typically includes a backend functionality for key generation, distribution, and replacement. It may further integrate specific client functionalities for injecting keys, storing and managing keys on the client devices.

Key management and key management systems are becoming increasingly important for the security of connected devices and applications with the development of the Internet of things and cloud computing.

Hardware security modules (HSMs) are physical computing devices that protect and manage keys for performing cryptographic operations (i.e., crypto-processing) and strong authentication. Such modules are physical devices (e.g., plug-in cards) that typically attach directly to a computer (e.g., a network server).

HSMs typically comprise secure crypto-processor chips to prevent tampering and bus probing. In general, HSMs may be designed to provide tamper evidence and tamper resistance (e.g., to delete keys upon tamper detection). HSM systems are sometimes able to securely back up keys they manage. HSMs are typically clustered to provide high availability and, as such, conform to high-availability requirements of modern data center environments. They may notably form part of infrastructures such as online banking applications and public key infrastructures.

Amongst other functions, a HSM may rely on specific hardware, which typically exploits a physical process, to create a sufficient source of randomness (characterized by entropy). The available randomness is, in turn, used to generate random keys.

In such HSMs, the random number generation (RNG) process is restricted by the amount of available entropy in the entropy pool of the HSM. When the entropy pool happens to be depleted (e.g., during high loads), no RNG can be performed anymore. In such cases, keys and initialization vectors (IVs) cannot be generated anymore; their generation is delayed until more entropy is available. Thus, performance of KMSs can suffer during high loads.

SUMMARY

According to aspects of the invention, the present invention is embodied as a computer-implemented method for managing cryptographic objects in a key management system. This system comprises a set of one or more hardware security modules, or HSMs, as well as clients interacting with the HSMs on behalf of users (who interact with the clients in practice). The method comprises monitoring, for each HSM of the set, an entropy pool and/or a load at each HSM. The entropy pool of a HSM refers to the entropy that is available at this HSM for it to generate cryptographic objects. The load induced at a HSM is the load arising from the users interacting with clients in order to obtain cryptographic objects. Cryptographic objects are generated, at said each HSM, according to the monitored entropy pool and/or load. Accordingly, the extent in which such objects are generated depends on the monitored entropy pool and/or load.

The present approach makes it possible to accumulate cryptographic objects beyond current needs from the clients, when entropy is still available at the HSMs. When, later on, entropy happens to deplete due to high loads, use can be made of the accumulated objects to still satisfactorily serve the requests. Accordingly, the present solution allows potential entropy depletion issues to be mitigated (e.g., postponed, if not prevented), while ensuring performance (cryptographic material is still delivered, even at high loads), in a safe environment (HSMs).

The load induced at each HSM can be monitored. Indeed, assuming that entropy is the main bottleneck resource, it is sufficient to monitor the load at a HSM, as an indicator of the current residual entropy. In such cases, the extent in which cryptographic objects are generated at each HSM depends on the monitored load. For example, the rate at which such objects are generated is increased if the monitored load drops under a given, load threshold value.

As described above, according to the present methods, cryptographic objects can be generated at the HSMs so as to accumulate reserves of cryptographic objects for future uses. Furthermore, at least part of the generated objects (e.g., unwrapped cryptographic keys) can be instructed to be stored on the HSMs, so as to ensure a safe environment for the generated objects.

The generated objects may notably include cryptographic keys (including symmetric keys and/or asymmetric keys), as well as initialization vectors. Upon request of the clients, cryptographic operations can subsequently be performed at the HSMs, whereby initialization vectors are used along with cryptographic keys as input to cryptographic primitives, e.g., for data encryption.

The generated cryptographic keys and initialization vectors may for instance be stored on the HSMs, at least temporarily. In addition, the generation process can include a key wrapping process, based on a master key residing in each HSM, so as to wrap keys generated at the HSMs and obtain wrapped keys. Then, the wrapped keys can be supplied (e.g., to clients) for subsequent storage on an external storage medium (e.g., at or near the clients).

Now, an adaptive management can be contemplated, to address limited storage capabilities of the HSMs. That is, in embodiments, the memory capacity of each HSM is monitored. E.g., this capacity can be continually checked, e.g., prior to generating cryptographic objects. Thus, it can be aptly decided whether to maintain all the generated objects, or to store them externally.

That is, if the memory capacity is sufficient, e.g., larger than a given threshold value, the (unwrapped) keys corresponding to wrapped keys previously supplied need not necessarily be deleted.

This way, when later receiving a request from one of the clients to perform a cryptographic operation (the request accompanied by a wrapped key as previously supplied or an identifier thereof), it may be sufficient to attempt to locate a corresponding key in one of the HSMs. The requested cryptographic operation can then be performed at said one of the HSMs based on the located key.

Now, if the monitored memory capacity as checked is insufficient (e.g., smaller than a given threshold value), cryptographic objects generated at a HSM may be supplied for subsequent storage on an external storage medium, while corresponding cryptographic objects are deleted from this HSM.

The supplied objects typically include wrapped keys, such that corresponding cryptographic material can be deleted from the HSMs. The deleted material may notably comprise cryptographic keys, e.g., in their wrapped and/or unwrapped state. In addition, because the supplied cryptographic material can comprises initialization vectors as well, such initialization vectors may be deleted from the HSMs too.

All this allows memory space to be saved on the HSMs. The deleted material can nevertheless be restored, as needed, according to embodiments of the invention as described below.

For instance, clients may send requests to perform a cryptographic operation, where the requests comprise wrapped keys as previously supplied from the HSMs. Then, when receiving such a request, a HSM may proceed to unwrap the wrapped key received, according to a master key as residing in this HSM, to restore a corresponding key. The requested cryptographic operation can thus be performed at the HSM based on the restored key.

In fact, when receiving a request (accompanied by a wrapped key), one may first attempt to locate a corresponding key in one of the HSM and, if no such key can be found, proceed to unwrap the key, for efficiency reasons.

The monitored memory capacity can be a capacity of a hardware memory device configured, in said each HSM, as cache memory for said each HSM.

In embodiments, cryptographic objects are generated at the HSMs according to a parameterized function of the monitored entropy pool and/or load. This function may further be updated according to inputs received as to one or more parameters of the function.

Moreover, the present method can include monitoring cryptographic objects already generated at the HSMs, so as to obtain corresponding statistics. Thus, comparing such statistics with reference data (e.g., targets to be achieved) makes it possible for the cryptographic objects to be subsequently generated at the HSMs based on outcomes of such comparisons.

Embodiments of the invention described herein can be based at least in part on monitoring loads at the HSMs. In variants, however, one may primarily monitor the entropy pool of each HSM. In that case, the extent in which cryptographic objects are generated at the HSMs depends on the monitored entropy pool, rather than the load. Also, the rate at which such objects are generated is increased if the monitored entropy pool exceeds a given, entropy threshold value.

Now, a dual scheme can be contemplated. For example, although one may primarily monitor the loads induced at the HSMs, one may, in parallel, monitor the entropy pool of each HSM (e.g., based on estimates of the residual entropy), so as to match current loads to current entropy values at the HSMs. That is, cryptographic objects may be accumulated at a HSM (when possible and as possible), in order to adjust the load induced at this HSM with respect to a current value of the monitored entropy pool. The same scheme can be implemented in parallel at each HSM. This way, the global HSM load can adjusted to a global, current entropy.

In all cases, the present methods may be used to generate cryptographic objects so as to mitigate a potential entropy depletion of the entropy pools of any of the HSMs.

According to another aspect, the invention is embodied as a computerized system for managing cryptographic objects, e.g., a key management system. The system comprises a set of one or more HSMs and clients configured to interact with the set of HSMs on behalf of users. On the one hand, and consistently with the present methods, the system is configured to monitor an entropy pool and/or a load induced at said each HSM. On the other hand, the system makes sure that cryptographic objects are generated, at each HSM, according to the monitored values. As a result, the extent in which such objects are generated depends on the monitored values.

In embodiments of the invention, the clients are implemented in a cloud. Clients may notably be implemented as containers, virtual machines, and/or respective computer devices.

According to a final aspect, the invention is embodied as a computer program product for managing cryptographic objects in a key management system such as described above. The computer program product comprises a computer readable storage medium having program instructions embodied therewith. The program instructions are executable by one or more processors, to cause to take steps according to the present methods, for each HSM of the set.

Computerized systems, methods, and computer program products embodying the present invention will now be described, by way of non-limiting examples, and in reference to the accompanying drawings.

BRIEF DESCRIPTION OF THE DRAWINGS

The accompanying figures, where like reference numerals refer to identical or functionally similar elements throughout the separate views, and which together with the detailed description below are incorporated in and form part of the present specification, serve to further illustrate various embodiments and to explain various principles and advantages all in accordance with the present disclosure, in which.

The accompanying drawings show simplified representations of computerized systems as involved in embodiments. Similar or functionally similar elements in the figures have been allocated the same numeral references, unless otherwise indicated.

DETAILED DESCRIPTION

The following description is structured as follows. First, general embodiments and high-level variants are described (sect. 1). The next section addresses more specific embodiments and technical implementation details (sect. 2).

1. General Embodiments and High-Level Variants

Figure 1:
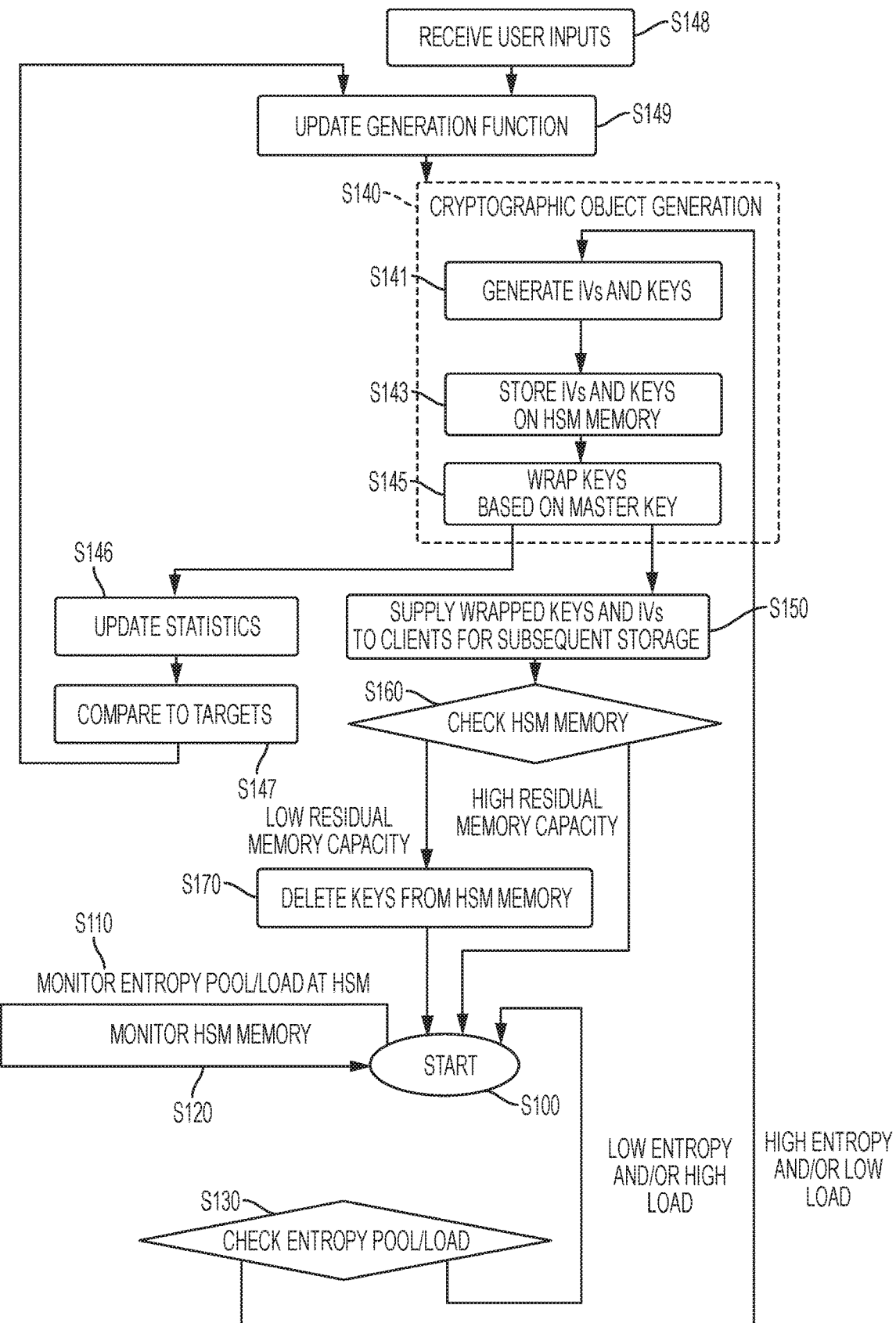
FIG. 1 is a flowchart illustrating high-level steps of a method for managing cryptographic objects, according to embodiments.
Figure 3:
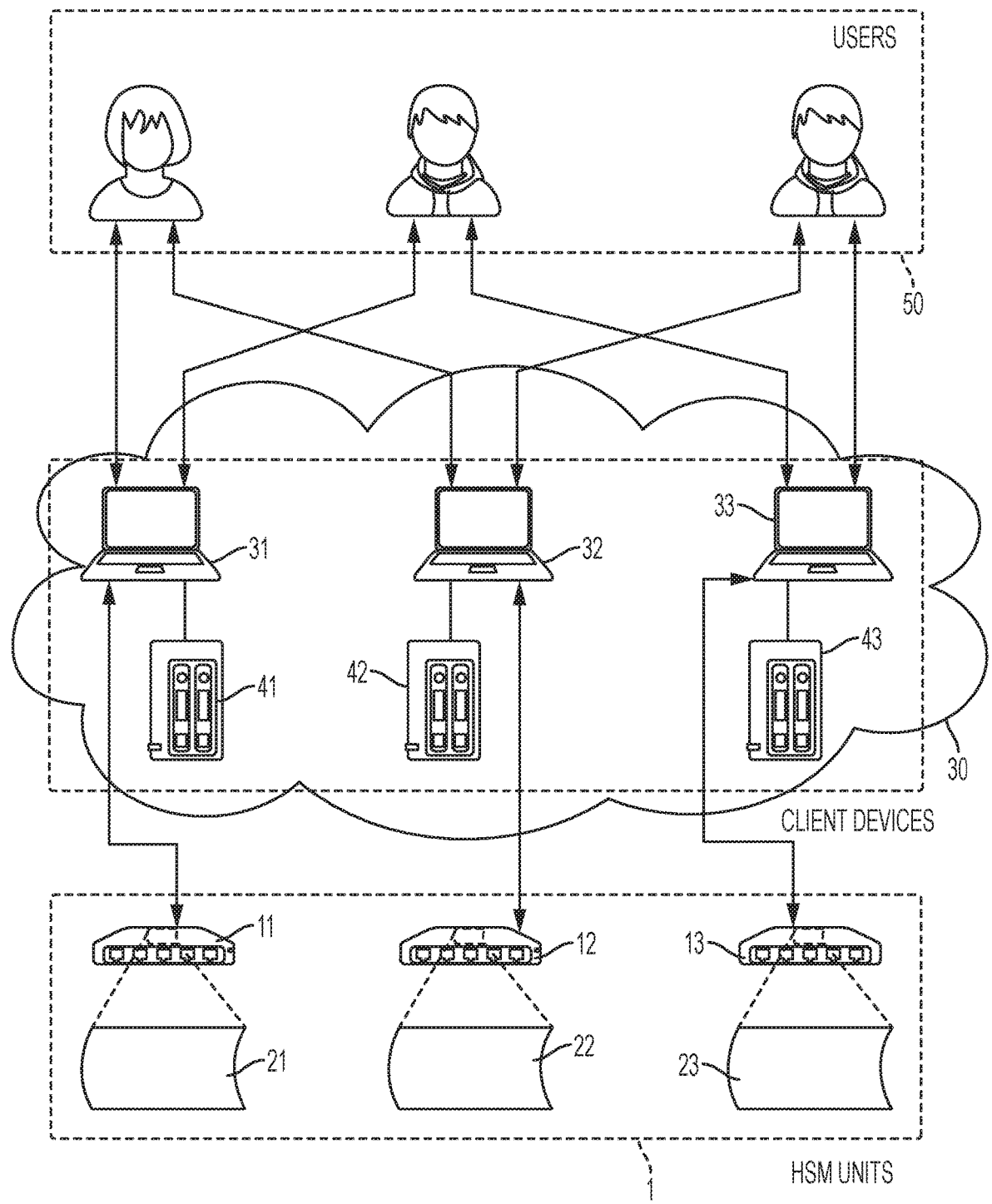
FIG. 3 schematically illustrates selected components and actors of a key management system, where clients interact with HSMs on behalf of users, and where clients operate in a cloud, as in embodiments.
Figure 4:
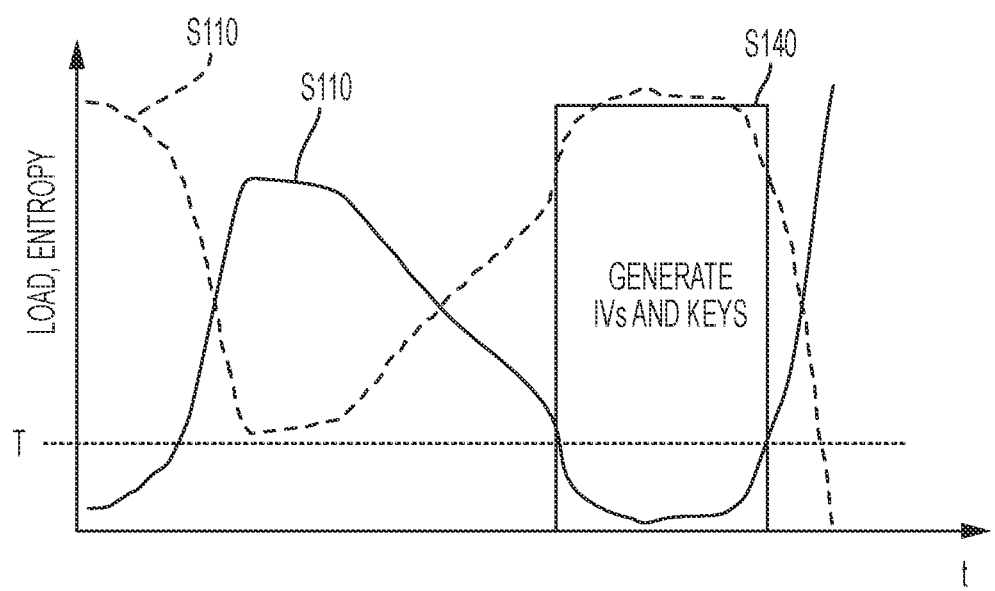
FIG. 4 is a plot comparing typical time evolutions of an entropy pool of a HSM and a load induced at this HSM, due to users interacting with a client of the HSM, as well as a pro-active generation of cryptographic objects at this HSM, as involved in embodiments of the invention.

In reference to FIGS. 1, 3 and 4, an aspect of the invention is first described, which concerns computer-implemented methods for managing cryptographic objects in a key management system 1.

Such a system is depicted in FIG. 3. It involves a set of one or more hardware security modules 11-13 (hereafter HSMs), as well as clients 31-33 interacting with the HSMs 11-13 on behalf of users 50. Though the present methods may already be implemented in a system comprising a single HSM, such methods likely involve a plurality of HSMs, as assumed in the following. In practice, the users 50 interact with the clients 31-33, which gives rise to various crypto-processing operations (strong authentications, encryptions, decryptions, etc.) performed by the HSMs, which thereby supply data, e.g., encrypted/decrypted data, to the clients.

Generally, the methods proposed herein revolve around monitoring the entropy pools of the HSMs and/or the loads induced at the HSMs, in order to proactively generate cryptographic objects, so as to avoid (or, at least, postpone) issues related to entropy depletions at the HSMs.

Assume that such methods start at step S100, as in FIG. 1. Then, for each HSM 11, 12, 13, the entropy pool and/or the load induced at this HSM is continuously monitored, as illustrated by the loop S110 in FIG. 1. The "entropy pool" refers to the entropy available for this HSM to generate cryptographic objects (hereafter COs), whereas the "load" is the load induced at this HSM due to users 50 interacting with the clients 31-33 in order to obtain COs from this HSM, see FIG. 3. This is described later in detail.

Next, COs can be generated S140 at each HSM 11, 12, 13 according to the monitored entropy pool and/or load, which typically involves continually checking S130 the current load/entropy levels. As a result, the extent in which such objects are generated S140 at each HSM depends on the entropy pool and/or load as monitored for this HSM. Such steps are implemented in parallel for each HSM of the set.

As previously noted herein, several HSMs can be involved (typically three or more for a same region) and HSMs are typically assumed to be clustered, so as to provide higher availability. In embodiments of the invention, there can be a one-to-one mapping between the clients and HSMs. In other words, one client interacts with one HSM at a time, to ease implementation and resource management. In variants, and in order to ensure a high-availability of clients, one may assign more than one client, spread across different availability zones, to each HSM. For example, different availability zones may correspond to two separate racks, in the case where two physical machines (in a given datacenter) are arranged on two separate racks. Here, if a physical machine (on one rack) fails, the hot spare (physical machine) remaining on the other rack allows the service to remain available. There can be multiple availability zones within a same region. A region may for instance refer to a datacenter in a particular region (area/city/country). Other architectures and other mappings can, however, be contemplated.

Clients are computerized resources, which may for instance be applications or containers (so as to allow multiple isolated user-space instances), running on one or more machines. Clients may else be or involve virtual machines (VMs), or distinct physical devices. In all cases, the clients 31-33 can possibly be implemented in a cloud 30 (as assumed in FIG. 3), so as to provide crypto-processing operations as a cloud service, e.g., for large infrastructure such as mentioned in the background section. Note that an intermediate (e.g., a software) layer may be involved between the users 50 and clients, e.g., to assign metadata needed to distribute the generated COs, especially in cloud implementations. More generally though, the present invention may be used for any cryptographic application, e.g., involving data encryption/decryption (possibly streamed data), authentication, digital signing and/or any sensitive data processing.

For example, the system 1 of FIG. 3 may comprise N HSMs, respectively interacting with N clients 31-33 (N≥2, though N is likely much larger). Assuming a one-to-one mapping between clients 31-33 and HSMs 11-13 (as in FIG. 3, thick arrows), the above steps may easily be carried out in respect of each of the HSMs 11-13. That is, the resources monitored may correspond to: (i) an entropy pool at each HSM for it to generate COs; and/or (ii) a load induced at each HSM due to one or more users interacting with a client mapped to said each HSM, in order to obtain COs.

HSMs 11-13 as contemplated herein are tamper-resistant devices; they provide a safe physical environment, wherein high security crypto-processing operations can be conducted. The HSMs contain hardware-based random number generators. Data produced by the HSMs such as data obtained from the generated random numbers is, in a certain extent, available to the clients 31-33 (to the clients only, and not to the users). More precisely, such data can be made available to selected applications running at the clients, which applications are, typically, suitably authenticated and logged in, to have access to data produced by the HSMs and otherwise communicate with the HSMs. Yet, HSMs remain relatively isolated devices, which are used by a limited number of clients.

Entropy denotes the degree of randomness of random data available at the HSMs 11-13, for use in crypto-processing operations. Randomness may be collected from dedicated randomness generators, e.g., based on some physical sources such as noise, variations of electrical signals, or any disturbance, as known per se. In variants, the random generators may also be based on some extrinsic events, e.g., bits associated to a timing of the client requests and/or data included in such requests. It is noted, however, that such variants can involve systematic patterns, which would impact the degree of randomness of the generated numbers.

As said earlier, the present approach amounts to proactively pre-generate COs and, as such, allows such objects to be accumulated when the load at the HSMs 11-13 is low/the available entropy is large. Accumulating reserves of COs makes it later possible to suitably serve requests even when these throng the HSMs at high loads. That the COs are accumulated means that they are pre-generated in excess of current needs, for later use. This also means that, at low loads, only a fraction of the pre-generated COs are typically delivered to meet current requests.

As a result, instead of storing entropy for later use, here the available entropy can readily be used as and when available. Thus, the present approach not only addresses entropy exhaustion but it also allows performance to be improved, according to the pre-generation of COs. Also, by accounting for load, embodiments as described herein do not excessively affect the current workload of HSMs 11-13.

The present methods aim at mitigating (i.e., postponing or even preventing) entropy depletion in a key management system. Entropy depletion may else likely occur at a point in time where the load has exceeded a given threshold T, see FIG. 4. In detail, the random number generation process used by the HSMs is restricted by the amount of available entropy in the entropy pool of each HSM, which depends on the current load and current supply rate of the generation process. When the entropy pool is depleted, no random number generation (hereafter RNG) can be performed. Thus, keys and initialization vectors (IVs) cannot be generated anymore and their generation is delayed until more entropy is available.

Performance and security can thus suffer during high loads, whence the advantages of the invention, which allows entropy depletion to be mitigated, without it being necessary to modify the HSMs. That is, existing HSMs can be relied on, which do not necessarily need be modified.

RNG is a challenge for many security applications, e.g., such as applications running in virtualized environments. In that respect, embodiments of the present approach are easily scalable, according to a one-to-one mapping between clients 31-33 and HSMs, as in embodiments of the invention. In addition to readily use the available entropy, the pre-generation of COs can be securely managed, inasmuch as the generated objects can be stored on the HSMs. The most critical data can be maintained within the HSMs, whereas the storage of less critical data can be outsourced, e.g., on the clients' side, as in embodiments described herein.

Thus, embodiments of the present invention ensure both performance and security, and can further easily be made scalable, while they do not require to modify the HSMs. This, altogether, makes it perfectly adequate for the clients 31-33 to be implemented in a cloud. Thus, the present methods can advantageously be provided as cloud-based services, as in embodiments.

Amongst other variants, three classes of embodiments can be contemplated, as explained below:

A first approach consists in solely monitoring S110 the load, e.g., due to requests as to random numbers, cryptographic keys or any other crypto-related objects at the HSMs. This approach is entropy-agnostic: that the entropy pool (e.g., the random number supply) is not monitored;

A second approach is to solely monitor the entropy pool (i.e., the replenishment of random number supply). This second approach is load-agnostic. The load is not monitored as such, though it may typically be assumed to be always medium/high. Still, because the entropy may typically need be estimated based on a current load (e.g., via any appropriate statistical model, machine-learning model, or an analytical function), monitoring the entropy may eventually amount to monitoring the load too and, from this, extrapolating the entropy; and A third approach is to monitor both the entropy pool and the load at the HSMs, e.g., using high and low thresholding methods. This way, a fully balanced management system can be contemplated, wherein, e.g., a dual-constraint optimization scheme can be implemented in order to match the online load (demand) to the entropy pool (supply). In other words, the online load can be effectively lowered by providing pre-generated objects to serve requests, hence allowing entropy to replenish. Thus, by adjusting the load to a currently measured (or, rather, estimated) entropy value, the load can be matched to the entropy pool, so as to maintain HSMs in (more or less) stationary states.

Ideally, COs are generated S140 at the HSMs in proportion to the monitored entropy pool and/or in inverse proportion to the monitored load. However, the relation between the pace at which COs are generated may be somewhat cruder in practice. E.g., a constant generation rate may be applied when entropy exceeds a given, respective threshold value and/or when the load is below a given, respective threshold value, see FIG. 4.

In the example of FIG. 4, crypto-objects are generated S140 according to a binary process, i.e., they are generated, or not (according to the entropy/load levels), yet without necessarily involving a net proportion relation (or inverse relation proportion) to the monitored values. In general, however, more objects are generated S140 when the load is below a given, respective threshold value than when the current load exceeds this threshold value. And similarly, more objects can be generated when the entropy exceeds a given, respective threshold value than when entropy is below that threshold value. Finally, note that in the example of FIG. 4, the threshold value T is taken to be identical for both the depicted entropy and load, for the sake of simplification (the graph otherwise assumes free units for the load and entropy). In practice, however, the units will likely differ, such that there is no reason for such threshold values to be identical.

Embodiments of the invention as described herein are primarily based on monitoring S110 the load induced at each HSM 11, 12, 13, rather than the entropy. In other words, the extent in which such objects are generated S140 at each HSM 11, 12, 13 depends on the monitored load. In practice, the rate at which such objects are generated S140 is increased if the monitored load drops under a given, load threshold value. As assumed in FIG. 4, the current entropy pool and load at a given HSM shall, typically, roughly vary inversely over time, provided that entropy is the essential bottleneck resource. Thus, monitoring the loads will normally suffice in practice, without it being necessary to explicitly monitor the entropy pool. Yet, additional factors may further impact the loads at the HSMs, such as computational resources needed to actually generate the COs. Therefore, the entropy pool and the load may not vary in perfect inverse proportions over time, in practice.

Notwithstanding, in embodiments of the invention, the present methods are not load-agnostic. In other words, the load is explicitly monitored and the monitored load values impact the extent in which COs are generated. Several methods are known, which allows a real-time load to be monitored at a node of a network, as the skilled person knows.

The HSM loads may notably be measured from the clients 31-33 (which is particularly easy in a one-to-one mapping, given the known characteristics of the HSMs), or at the HSMs themselves (if equipped with corresponding functions), or still at a gateway or any suitable node of the network, assuming this node is continuously informed of requests made by the clients. Although the CO generation process S140 eventually takes place at the HSMs, it may be handled from a node (e.g., a traffic controller) of the network. In variants, the process is delocalized throughout several nodes. A variety of intermediate configurations can be contemplated, just like in network traffic management solutions.

In embodiments, it is further instructed to store S143 at least part of the generated COs on the HSM 11, 12, 13 where CO generation takes place, so as to secure the generated objects. Still, only the most critical data (e.g., master keys, cryptographic keys in unwrapped forms) need strictly be maintained within the HSMs, whereas the storage of less critical data can be outsourced, to save memory space on HSMs, as discussed later in detail.

In that respect, the generated S140 COs typically include cryptographic keys, which may comprise symmetric keys and/or asymmetric keys, as well as initialization vectors (IVs). IVs are used as input to cryptographic primitives, along with secret keys for data encryption. That is, such vectors are used as an additional random input to the encryption algorithm, so that the result of encrypting same clear data differs each time a different vector is used. However, IVs are less critical than cryptographic keys and can be exposed, such that they can possibly be stored outside the HSMs, e.g., at the clients 31-33 or in close proximity therewith 41-43.

As seen in FIG. 1, the generated cryptographic keys and IVs can be instructed to be stored S143, at least temporarily, on the HSMs 11, 12, 13 where they have been generated S141. To that aim, the HSMs 11-13 are equipped with hardware memory, which can be configured as cache memory for the HSMs. The hardware cache is used by HSM to reduce the average cost (time- or energy-wise) to access data stored thereon.

As said, some of the generated objects are nevertheless supplied S150 by each HSM 11, 12, 13, e.g., to clients, for subsequent storage on an external storage medium 41-43. The external storage media 41-43 are, e.g., attached to or in close data communication with the clients 31-33, that is, in the client space (and not in users'), where data can still be relatively safely stored, as assumed in FIG. 3. This way, at least some of the supplied material (or related material) can subsequently be deleted, step S170.

Whether to store and maintain such objects on the HSMs 11-13 actually depends on the storage strategy chosen, which may further involve to monitor the memory capacity at the HSMs, as in embodiments described below. In particular, the generated cryptographic keys and IVs may first be stored on the HSMs and later be deleted, depending on the memory capacity of the HSMs, as we shall see.

In embodiments, the overall generation step S140 further comprises wrapping S145 one or more of keys as previously generated S141, locally, i.e., at each HSM 11, 12, 13. This is carried out based on a master key residing in each HSM 11, 12, 13, as known per se. One or more wrapped keys are accordingly obtained S145, respectively.

The storage of the wrapped keys obtained at step S145 can be outsourced S150 (by each HSM concerned) to external storage media 41-43. Typically, steps S145 and S150 are implemented as a single step, as part of the wrapping process, whereby the wrapped keys are directly supplied upon wrapping the keys (contrary to what FIG. 1 may suggest). However, in variants, the wrapped keys may temporarily be retained in the cache of the HSMs, prior to being supplied to a requesting user/client, e.g., to accommodate current network traffic conditions. In all cases, the clients 31-33 can replicate the wrapped keys, or maintain identifiers thereof. Yet, the corresponding (unwrapped) keys can later be identified, if necessary, e.g., using a local mapping to key handle stored on the HSM. Incidentally, we note that the terminology "unwrapped" is here used to denote keys that are in unwrapped or non-wrapped form.

As illustrated in FIG. 1, whether to delete or not cryptographic material stored on the HSMs 11-13 can be based on the memory capacity of the HSMs. To that aim, the memory capacity of the HSMs is monitored S120. Thus, the memory capacity of a given HSM can be continually checked 120, 160, e.g., prior to a new CO generation step S140. There, if S160 the memory capacity happens to be sufficient (e.g., larger than a given capacity threshold value), no cryptographic material need be deleted from this HSM and the process goes back to step S100. A new cycle starts, whereby a current load/entropy level is checked S130 and, load/entropy permitting, this HSM may proceed to a new cycle of CO generation 140, to serve further client requests, and so on.

However, if S160 the memory capacity of this HSM happens to be insufficient (e.g., smaller than a given capacity threshold value), then material corresponding to the previously supplied S150 COs can be deleted, S170, to save space on this HSM.

As said, the supplied S150 COs can include wrapped keys as previously obtained S145. Thus, the wrapped keys can be deleted from the HSM where they have been obtained (it being reminded that wrapped keys are typically deleted, locally, as part of the wrapping process S145-S150). In addition, the cryptographic keys (in unwrapped form) corresponding to the wrapped keys supplied at step S150 can be deleted too, at step S170.

Moreover, the COs supplied at step S150 may further comprise IVs, as previously generated S141 at a HSM 11, 12, 13. Thus, the IVs supplied S150 may be deleted from this HSM too, be it at step S170 or earlier (e.g., upon supplying the wrapped keys S150).

In all cases, the above scenarios always assume that keys in unwrapped form are maintained at HSMs 11-13 or are deleted, S170. Such keys are never meant to leave the HSM, for security reasons. Thus, the set of COs eventually deleted will likely be distinct from the set of objects supplied S150 to external storage media 41-43, though some overlap and correspondence exist. E.g., keys can be supplied S150 (in their wrapped form only) to client devices for storage thereon, and therefore corresponding keys (in both wrapped and unwrapped forms) can be deleted from the HSMs. Such deletion is not prejudicial, because subsequent requests may be accompanied by wrapped keys, so that the accompanying wrapped keys can be unwrapped at the HSMs, according to master keys residing therein, as later discussed in reference to FIG. 2.

The scheme of steps S150-S170 makes it possible to mitigate potential issues related to the saturation of the caches of the HSMs. On the contrary, with prior solutions, high loads may not only lead to entropy depletions but, in addition, they may result in a saturation of the caches of the HSMs. Here, externalizing the storage of less sensitive data (like wrapped keys and IVs) makes it possible to delete cryptographic material corresponding to the outsourced material from the HSMs 11-13. However, such deletion is only involved when the memory capacity of a HSM saturates, in order not to impact performance on serving requests, as discussed below in reference to FIG. 2.

In all cases, master keys need be maintained at the HSMs. The master keys and unwrapped keys are never meant to leave the HSMs, it being reminded that unwrapped keys can be deleted S170 from the HSMs, as in embodiments discussed above.

Figure 2:
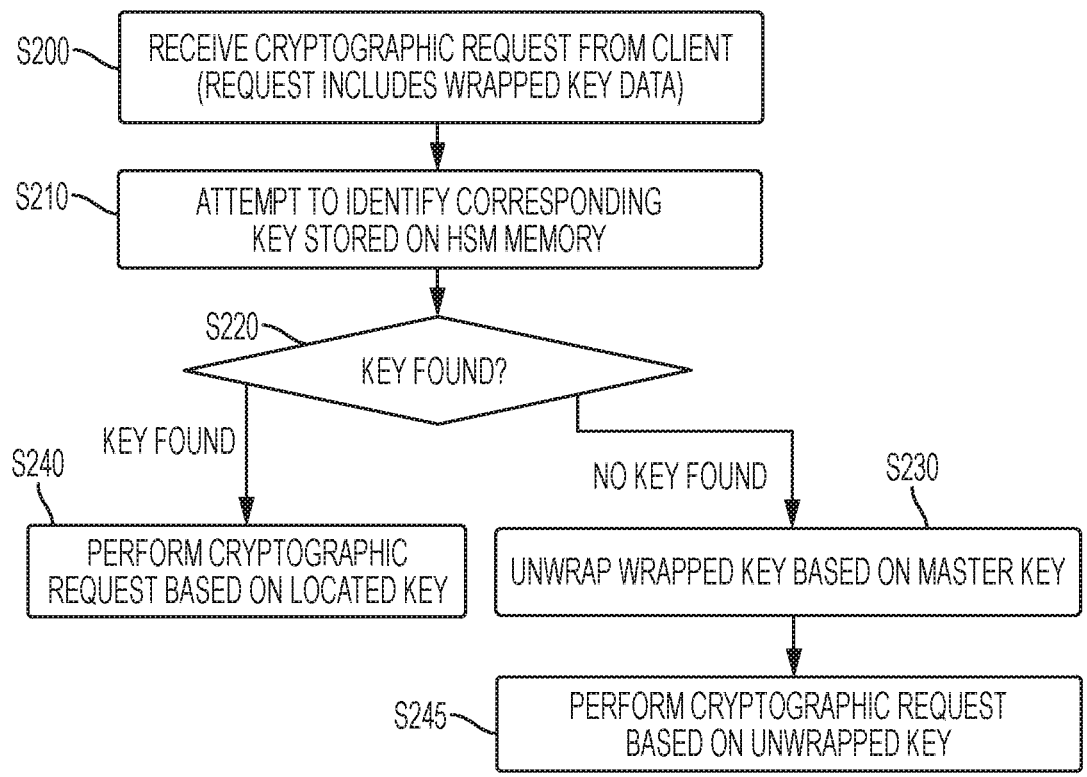
FIG. 2 is a flowchart illustrating high-level steps of a method for managing requests from clients interacting with hardware security modules (HSMs) on behalf of users, as involved in embodiments.

Referring now more particularly to FIG. 2, embodiments are described, which concern the handling of client requests by the system. As explained earlier, COs can be generated S140 at each HSM 11, 12, 13, so as to accumulate reserves of COs for future uses S200. In particular, upon receiving a request S200 of one of the clients 31-33, a HSM 11, 12, 13 may perform S210-S245 a cryptographic operation, according to the received request. On this occasion, one or more IVs may be used along with one or more cryptographic keys, as input to a cryptographic primitive implemented at the HSM, e.g., for data encryption.

However, at this point, unwrapped keys may be located on the HSMs, or not, depending on the storage strategy chosen. Also, in embodiments such as discussed in reference to FIG.

1, some of the cryptographic objects are maintained at the HSMs (when memory capacity is sufficient), whereas some other objects are missing. The missing objects correspond to objects that have been created when the memory capacity was insufficient; their storage has therefore been outsourced and the corresponding cryptographic material has subsequently been deleted. Thus, depending on the case, a suitable key may first need be located on the HSM, based on the client request, or this key may first need be unwrapped, based on a wrapped key provided with the request, as explained below.

As seen in FIG. 2, a request to perform a cryptographic operation may be received from one of the clients 31-33 at a HSM, at step S200. This request is accompanied by a wrapped key, which was previously supplied S150 to the client. Based on the request, a HSM controller (not shown) may first attempt to locate S210, S220, in one of the HSMs 11, 12, 13, a key corresponding to the wrapped key accompanying the request. Assuming that a match is found, S220, the requested cryptographic operation can be performed S240 at the HSM guarding the located key, based on that key.

Several variants can be contemplated. For instance, request might be accompanied by an identifier of the wrapped key, rather than by the wrapped key itself. In that case, one attempts to locate S210, S220 a key corresponding to the identifier received with the request. In that respect, steps S200-S220 may be performed based on hashes and key handles, as known per se. For example, at step S210, one may first compare a hash of a wrapped key (i.e., the hash being an identifier received at step S200) against a local mapping to the key handle stored on the HSMs. Once a match is found S220, the corresponding key handle is used to access a corresponding (unwrapped) key.

However, if no match is found at step S220, the wrapped key is needed to unwrap the key. To that aim, one may use the wrapped key provided together with the request at step S200, if any. If an identifier of the wrapped key was provided instead of the wrapped key itself, additional communication (not shown) with the requesting client is needed in order to obtain the wrapped key. Suitable protocols may be implemented, to deal with such situations. Upon receiving the wrapped key (whereby the request is now completed), the HSM proceeds to unwrap S230 the wrapped key received, according to a master key residing therein. This way, the corresponding (unwrapped) key is restored. The requested cryptographic operation is finally performed at step S245, based on the restored key.

If necessary, IVs are provided along with wrapped key data in the requests, in order for the HSMs to suitably perform the requested operations.

The embodiment specifically captured by FIGS. 1 and 2 makes it possible to handle both entropy depletion issues and potential cache saturation at the HSMs, while maintaining performance and security. At low loads/high entropy, COs are accumulated in view of future requests. Part of the cryptographic material, however, is not maintained at the HSMs when their residual memory capacity is low. Yet, the scheme of FIG. 2 allows deleted material (e.g., unwrapped keys) to be safely restored, based on more critical cryptographic objects (e.g., master keys) that are maintained at the HSMs (and does not leave the HSMs).

Referring back to FIG. 1, additional embodiments are now described, which relates to the manner in which the cryptographic material is generated at step S140. For example, the COs may, at each HSM 11, 12, 13, be generated S140 according to a parameterized function of the monitored entropy pool and/or load. This function includes parameters, which may be updated S149 according to inputs received at the HSMs, e.g., from the users (but via the clients) or from some controller, based on automatic methods. In all cases, inputs received at step S148 (which concern parameters of the function) are used to update S149 this function. This function defines the generation profile(s). Different types of COs may have different generation profiles. Thus function may notably define relations (i.e., proportions) between an ideal rate of generated COs and the current load/entropy levels.

This function may for instance be analytical (and possibly parametric) or numerical (e.g., it may be a mere table). This function may for example be parametric, so as to decompose into several functions (e.g., one for each type of COs to be generated S140).

In addition, reference data can be relied upon, in order to set targets to be pro-actively reached at the HSMs. For instance, the generated COs may be monitored at each HSM 11, 12, 13, so as to obtain S146 corresponding statistics. Such statistics can then be compared S147 with reference data. Thus, COs subsequently generated S140 can be based S149 on outcomes of the comparisons performed at step S147. For example, the generation function used to determine the generation profiles of COs may be updated at step S149, based on comparison outcomes, so as to generate COs in line with directions from the reference data.

Figure 5:
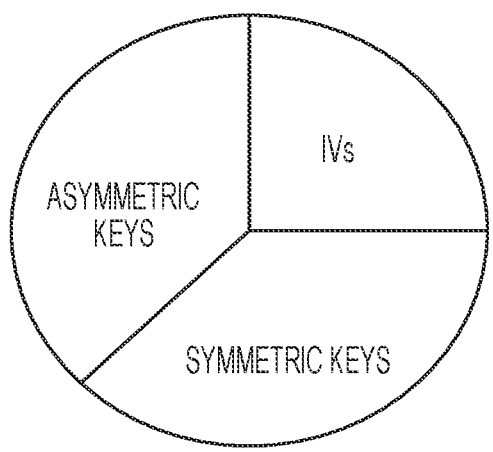
FIG. 5 is a pie chart representing an exemplary, ideal repartition of various types of cryptographic objects, as given as input to a generation process as shown in FIG. 1.

Such reference data may for instance be application specific targets. Such data may further specify proportions between different types of COs (e.g., symmetric keys, asymmetric keys, IVs, etc.), as illustrated by the pie chart of FIG. 5.

Next, according to another aspect, the invention can be embodied as a computerized system 1 for managing COs, e.g., a key management system (KMS), or a subsystem of a KMS. Main aspects of such systems have already been discussed earlier, with reference to the present methods. Therefore, such systems are only briefly described in the following. The CO management system 1 comprises one or more HSMs 11-13 (and can comprise several HSMs), as well as clients 31-33 configured to interact with the set of HSMs 11-13, on behalf of users 50, as discussed earlier.

There can be a one-to-one mapping between clients and HSMs. In other words, one client interacts with one HSM at a time, be it to ease implementation and resource management. Other architectures can, however, be contemplated.

In all cases, the system is configured to monitor the entropy pool of each HSM 11, 12, 13 and/or the load induced at each HSM, in operation. In addition, the system 1 makes sure that each HSM generates S140 COs according to the monitored entropy pool and/or load, as explained earlier in reference to FIG. 1. As a result, the extent in which such objects are generated S140 depends on the monitored entropy pool and/or load, in operation. Such a system 1 allows COs to be accumulated at low loads/high entropy.

In embodiments, the system 1 may further be configured to handle requests so as to prevent cache saturation of the HSMs, as described earlier in reference to FIGS. 1 and 2. To that aim, the memory capacity of each HSM need be monitored. For security reasons, such memory can be hardware memory configured as cache memory for each HSM.

In embodiments, the clients 31-33 are implemented in a cloud 30. Clients may notably be implemented as applications, containers, and be or involve virtual machines, and/or respective computer devices. The clients 31-33 may for instance consist of containers implemented at distinct devices, as assumed in FIG. 3.

A cloud is a set of computer resources organized in such a way that the owner of the resources may dynamically allocate part or all of those resources to users, e.g., for a fixed period of time. The cloud in which the clients 31-33 are implemented may be a private cloud, i.e., a cloud in which the users and owner belong to a same organization. In variants, this cloud is an external cloud, e.g., a public cloud, wherein the users and owner belong to different organizations. Private clouds can be used when owners or users do not wish to have their computation performed on the infrastructure of a third party, e.g., for reasons of security or reliability.

Next, according to a final aspect, the invention can be embodied as a computer program product for managing COs in a KMS. This computer program product comprises a computer readable storage medium having program instructions embodied therewith, where the program instructions are executable by one or more processors, to cause the latter to take steps according to the present methods. Aspects of the present computer programs are discussed in detail in sect. 2.2.

This program may for instance be run at the clients and the HSMs (in a delocalized fashion), or at specific nodes (e.g., the HSMs). In addition, this program may possibly involve a controller authorized to interact with the HSMs or with both the clients and HSMs. Many possible architectures can be contemplated, as the person skilled in the art will appreciate.

The above embodiments have been succinctly described in reference to the accompanying drawings and may accommodate a number of variants. Several combinations of the above features may be contemplated.

2. Specific Embodiments—Technical Implementation Details 2.1 Cloud Implementations It is to be understood that although this disclosure refers to embodiments involving cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

2.2 Systems, Methods and Computer Program Products

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present invention has been described with reference to a limited number of embodiments, variants and the accompanying drawings, it will be understood by those skilled in the art that various changes may be made and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated.

What is claimed is:

1. A computer-implemented method for managing cryptographic objects in a key management system, the system comprising a set of one or more hardware security modules (HSMs), and clients interacting with the HSMs on behalf of users interacting with the clients, the method comprising, for each HSM of the set:
   monitoring, using a processor of the key management system, an entropy pool of said each HSM for generating cryptographic objects and/or a load induced at said each HSM due to the users interacting with the clients in order to obtain such cryptographic objects; and
   generating, using the processor, cryptographic objects at said each HSM according to the monitored entropy pool and/or load, such that an extent in which such objects are generated depends on the monitored entropy pool and/or load;
   wherein generating said cryptographic objects comprises accumulating such objects at said each HSM, in order to adjust the load induced at said each HSM with respect to a current value of the monitored entropy pool.

2. The method according to claim 1, wherein:
monitoring comprises monitoring the load induced at said each HSM, wherein the extent in which such objects are generated at said each HSM depends on the monitored load, such that a rate at which such objects are generated is increased if the monitored load drops under a given, load threshold value.

3. The method according to claim 1, wherein:
said cryptographic objects are generated at said each HSM so as to accumulate reserves of cryptographic objects for future uses.

4. The method according to claim 3, wherein:
the method further comprises instructing to store at least part of the generated cryptographic objects on said each HSM.

5. The method according to claim 4, wherein:
generating the cryptographic objects at said each HSM comprises generating: cryptographic keys, the latter including symmetric keys and/or asymmetric keys; and initialization vectors.

6. The method according to claim 5, wherein:
the method further comprises, upon request of one of the clients, performing a cryptographic operation at said each HSM, whereby one or more of said initialization vectors are used along with one or more cryptographic keys as input to a cryptographic primitive for data encryption.

7. The method according to claim 5, wherein:
the method further comprises instructing to store the generated cryptographic keys and initialization vectors on said each HSM.

8. The method according to claim 7, wherein:
generating the cryptographic objects at said each HSM further comprises wrapping, based on a master key residing in said each HSM, one or more of the keys generated at said each HSM to obtain one or more wrapped keys, respectively.

9. The method according to claim 8, wherein the method further comprises:
supplying one or more of the wrapped keys obtained at said each HSM for subsequent storage on an external storage medium.

10. The method according to claim 9, wherein the method further comprises:
receiving, from one of the clients, a request to perform a cryptographic operation, the request comprising a wrapped key as previously supplied to the client, or an identifier of this wrapped key;
locating in one of the HSMs, a key corresponding to the wrapped key or the identifier received with the request; and
performing the requested cryptographic operation at said one of the HSMs based on the located key.

11. The method according to claim 8, wherein the method further comprises:
checking a memory capacity of said HSM, prior to generating said cryptographic objects; and
if the monitored memory capacity is smaller than a given memory capacity threshold value, supplying one or more of the cryptographic objects generated at said each HSM for subsequent storage on an external storage medium, and deleting, from said each HSM, one or more cryptographic objects corresponding to the one or more cryptographic objects supplied.

12. The method according to claim 11, wherein:
the supplied cryptographic objects comprise one or more wrapped keys as previously obtained at said HSM.

13. The method according to claim 12, wherein:
the one or more cryptographic objects deleted comprises one or more cryptographic keys corresponding to the one or more wrapped keys supplied.

14. The method according to claim 13, wherein:
the cryptographic keys deleted comprise both wrapped keys and unwrapped keys corresponding to the wrapped keys supplied.

15. The method according to claim 14, wherein:
the supplied cryptographic objects further comprise initialization vectors, as previously generated at said HSM, and
the one or more cryptographic objects deleted further comprise the supplied initialization vectors.

16. The method according to claim 14, wherein the method further comprises:
receiving, from one of the clients, a request to perform a cryptographic operation, the request comprising a wrapped key as previously supplied from said each HSM;

unwrapping the wrapped key received according to a master key residing in said each HSM to restore a corresponding key; and performing the requested cryptographic operation at said each HSM based on the restored key.

17. The method according to claim 11, wherein:

the monitored memory capacity is a capacity of a hardware memory device configured, in said each HSM, as cache memory for said each HSM.

18. The method according to claim 1, wherein:

the cryptographic objects are generated at said each HSM according to a parameterized function of the monitored entropy pool and/or load; and the method further comprises receiving inputs as to one or more parameters of the function and updating said function according to the received inputs.

19. The method according to claim 1, wherein:

the method further comprises, prior to generating the cryptographic objects:
monitoring cryptographic objects already generated at said each HSM, so as to obtain corresponding statistics; and
comparing such statistics with reference data, to obtain a comparison outcome, and wherein the cryptographic objects are subsequently generated at said each HSM based on the obtained comparison outcome.

20. The method according to claim 1, wherein:

monitoring comprises monitoring the entropy pool of said each HSM, whereby the extent in which such objects are generated at said each HSM depends on the monitored entropy pool, such that a rate at which such objects are generated is increased if the monitored entropy pool exceeds a given, entropy threshold value.

21. The method according to claim 2, wherein:

said cryptographic objects are generated so as to mitigate a potential entropy depletion of the entropy pool of said each HSM.

22. A computerized system for managing cryptographic objects, the system comprising a set of one or more hardware security modules (HSMs), and clients configured to interact with the set of HSMs on behalf of users, wherein the system is configured, for each HSM of the set, to:
monitor an entropy pool of said each HSM for generating cryptographic objects and/or a load induced at said each HSM due to the users interacting with the clients in order to obtain such cryptographic object; and
generate cryptographic objects at said each HSM according to the monitored entropy pool and/or load, such that an extent in which such objects are generated depends on the monitored entropy pool and/or load;
wherein generate said cryptographic objects comprises accumulate such objects at said each HSM, in order to adjust the load induced at said each HSM with respect to a current value of the monitored entropy pool.

23. The computerized system according to claim 22, wherein:

said clients are implemented in a cloud, as one or more of:
containers,
virtual machines, and
respective computer devices.

24. A computer program product for managing cryptographic objects in a key management system, the system comprising a set of one or more hardware security modules, or HSMs, and clients interacting with the HSMs on behalf of users interacting with the clients, the computer program product comprising a computer readable storage medium having program instructions embodied therewith, the program instructions executable by one or more processors, to cause, for each HSM of the set, to:
monitor an entropy pool of said each HSM for generating cryptographic objects and/or a load induced at said each HSM due to the users interacting with the clients in order to obtain such cryptographic objects; and
generate cryptographic objects at said each HSM according to the monitored entropy pool and/or load, such that an extent in which such objects are generated depends on the monitored entropy pool and/or load;
wherein generate said cryptographic objects comprises accumulate such objects at said each HSM, in order to adjust the load induced at said each HSM with respect to a current value of the monitored entropy pool.

* * * * *